(12) United States Patent
Franco

(10) Patent No.: US 11,106,619 B2
(45) Date of Patent: Aug. 31, 2021

(54) TRANSMISSION OF SYNCHRONOUS DATA VIA A SERIAL DATA BUS, IN PARTICULAR A SPI BUS

(71) Applicant: Valeo Systemes Thermiques, Le Mesnil Saint Denis (FR)

(72) Inventor: Ismaël Franco, Les Clayes-sous-Bois (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 575 days.

(21) Appl. No.: 15/514,006

(22) PCT Filed: Sep. 25, 2015

(86) PCT No.: PCT/EP2015/072085
§ 371 (c)(1),
(2) Date: Mar. 24, 2017

(87) PCT Pub. No.: WO2016/046361
PCT Pub. Date: Mar. 31, 2016

(65) Prior Publication Data
US 2017/0277652 A1 Sep. 28, 2017

(30) Foreign Application Priority Data
Sep. 26, 2014 (FR) ...................................... 1459147

(51) Int. Cl.
*H04W 84/20* (2009.01)
*G06F 13/42* (2006.01)

(52) U.S. Cl.
CPC ...... *G06F 13/4291* (2013.01); *G06F 13/4282* (2013.01); *H04W 84/20* (2013.01); *H04L 2212/00* (2013.01)

(58) Field of Classification Search
None
See application file for complete search history.

(56) References Cited

U.S. PATENT DOCUMENTS

| 5,303,227 A | 4/1994 | Herold et al. |
| 2004/0059965 A1* | 3/2004 | Marshall ............. G06F 13/4291 714/48 |

(Continued)

FOREIGN PATENT DOCUMENTS

| CN | 102 819 512 A | 12/2012 |
| CN | 103 685 275 A | 3/2014 |

(Continued)

OTHER PUBLICATIONS

International Search Report issued in corresponding application no. PCT/EP2015/072085 dated Nov. 11, 2015 (6 pages).

(Continued)

*Primary Examiner* — Ajit Patel
*Assistant Examiner* — Pamit Kaur
(74) *Attorney, Agent, or Firm* — Osha Bergman Watanabe & Burton LLP

(57) ABSTRACT

The invention concerns the transmission of synchronous data between a master communication module and a slave communication module via a serial data bus, in particular a SPI bus. According to the invention, the data to be transmitted by each of the two master and slave communication modules are encapsulated in a data field (31) of at least one frame further comprising a frame identifier (30), and two frames are exchanged simultaneously between the two master and slave communication modules according to at least one predefined sequencing corresponding to a unique pairing of the identifiers of the two frames exchanged simultaneously. The integrity of a communication can therefore be controlled by verifying the sequencing of the exchanged frames.

9 Claims, 6 Drawing Sheets

(56) References Cited

U.S. PATENT DOCUMENTS

| | | | | |
|---|---|---|---|---|
| 2004/0176857 A1* | 9/2004 | Tsunedomi | ........ | G05B 19/0421 |
| | | | | 700/2 |
| 2005/0239503 A1* | 10/2005 | Dressen | .................. | H04L 25/45 |
| | | | | 455/557 |
| 2006/0143348 A1* | 6/2006 | Wilson | ................ | G06F 13/4291 |
| | | | | 710/110 |
| 2008/0162811 A1* | 7/2008 | Steinmetz | ............. | G06F 3/0617 |
| | | | | 711/114 |
| 2014/0025936 A1* | 1/2014 | Morikawa | .......... | G05B 19/0428 |
| | | | | 712/225 |
| 2014/0317322 A1* | 10/2014 | Rohatschek | .......... | H04L 12/423 |
| | | | | 710/110 |

FOREIGN PATENT DOCUMENTS

| | | |
|---|---|---|
| EP | 1 011 240 A2 | 6/2000 |
| WO | 98/14850 A1 | 4/1998 |
| WO | WO-9814850 A1 * 4/1998 ............. G05B 15/02 |

OTHER PUBLICATIONS

Written Opinion of the International Searching Authority issued in corresponding application No. PCT/EP20151072085 dated Nov. 11, 2015 (5 pages).

* cited by examiner

TRANSMISSION OF SYNCHRONOUS DATA VIA A SERIAL DATA BUS, IN PARTICULAR A SPI BUS

The present invention relates in general to the transmission of data between a master communication module and a slave communication module via a serial data bus.

One particularly relevant, albeit non-limiting, field of application is that of motor vehicles. Today, motor vehicles are equipped with many electronic systems, themselves integrating subsystems. The systems and subsystems must constantly exchange data.

Today, motor vehicles are generally equipped with at least one CAN (Controller Area Network), allowing a plurality of network nodes, typically computers, to connect to the same communication bus to exchange messages between themselves. Other systems, in particular heating and/or air conditioning systems, electric rear-view mirror adjustment systems, electric power windows, etc., use a LIN (Local Interconnect Network) architecture. The LIN communication bus is a relatively slow and small bus, but it is reliable and economical, particularly if it is compared with the CAN bus. The LIN communication protocol is based on a master/slave configuration. In a heating and/or air conditioning system, for example, the master node is made up of an electronic control module, for example in a control panel located on the instrument panel of the vehicle, and the slave nodes comprise, in particular, a blower motor capable of operating a fan, a plurality of actuators to control the movements of air distribution and mixing flaps, one or more pickups comprising temperature detectors and one or more heating resistors. The electronic control module can thus receive status information at its request from the slave nodes, and transmits control information to the latter in order to perform the required functions of ventilation, car interior temperature adjustments, defogging, defrosting, etc., controlled from the control panel. A LIN architecture of this type is generally used as a subnetwork of a CAN bus (not shown) to which the electronic control module forming the master node is connected. The LIN protocol is a synchronous protocol but the message transmissions are asynchronous.

In some applications in which the required functional safety level of the electrical/electronic systems in the motor vehicles is maximum (level ASIL D according to the ISO 26262 standard), it may nevertheless be necessary to have a simultaneous two-way communication in order to optimize response times. This is the case particularly in architectures for which two computers must mutually verify one another via a full-duplex synchronous communication.

An SPI (Serial Peripheral Interface) could allow a synchronous message exchange of this type. In fact, as shown schematically in FIG. 1, an SPI interface is a synchronous serial link between a master computer 1 and a slave computer 2 using a minimum of three one-way connection wires to carry three logical signals, i.e.:
- an MOSI (Master Output, Slave Input) signal generated by the master computer 1 and intended for the slave computer 2;
- an MISO (Master Input, Slave Output) signal, generated by the slave computer 2 and intended for the master computer 1; and
- a clock signal CLK generated by the master computer 1 and used by the two computers 1, 2.

Nevertheless, the SPI protocol is a non-connection-oriented protocol, according to which the transmitting computer transmits data without alerting the receiving computer, and the receiving computer receives data without sending an acknowledgement. Furthermore, the SPI protocol does not offer any data integrity control, so that the receiving computer may use damaged data. Consequently, it is not possible to use the currently known SPI protocol in the context of a mutual check on the proper functioning of two computers.

The object of the present invention is to overcome the preceding limitations.

To do this, the subject-matter of the invention concerns a method for transmitting synchronous data between a master communication module and a slave communication module via a serial data bus, in particular an SPI bus, characterized in that the data to be transmitted by each of the two master and slave communication modules are encapsulated in a data field of at least one frame, further comprising a frame identifier, and in that two frames are exchanged simultaneously between the two master and slave communication modules according to at least one predetermined sequencing corresponding to a unique pairing of the identifiers of the two simultaneously exchanged frames.

According to other possible particular characteristics of the method according to the invention:
- the latter advantageously comprises a transmission integrity checking step in each of the two master and slave communication modules on the basis of an extraction of the identifier of a received frame and said at least one predetermined sequencing;
- the frame identifier is, for example, one-byte-coded;
- each frame of the plurality of exchanged frames preferably also comprises a control field including binary elements dependent on the data to be transmitted, for example a one-byte-coded checksum, and the method then comprises a data integrity checking step in each of the two master and slave communication modules on the basis of an extraction of the content of the data field and the control field of a received frame;
- two frames are transmitted successively by each of the two master and slave communication modules, preferably adhering to at least one predetermined inter-frame period;
- the transmission integrity checking step may then comprise a step of calculating, in each of the two master and slave communication modules, the time period separating two successively received frames and comparing the calculated time period with said at least one predetermined inter-frame period;
- the method may comprise a step of interrupting any frame transmission from one of the two master or slave communication modules during an interruption time period greater than said at least one inter-frame period, following any communication error detected during the transmission integrity checking step or the data integrity checking step;
- it is preferable to provide that no exchange of frames is initiated by the master communication module until a predetermined minimum waiting time period has elapsed.

The invention and its different aspects will be better understood from a reading of the following description, given with reference to the attached figures, in which:

FIG. 1, already described above, shows schematically an SPI link between a master computer and a slave computer;

FIG. 2 shows the structure of a data frame according to one possible embodiment of the invention for exchanging synchronous data between the two computers shown in FIG. 1;

FIG. 3 gives an example of two predetermined sequences according to the invention for exchanging frames between the two computers;

Figure 1:
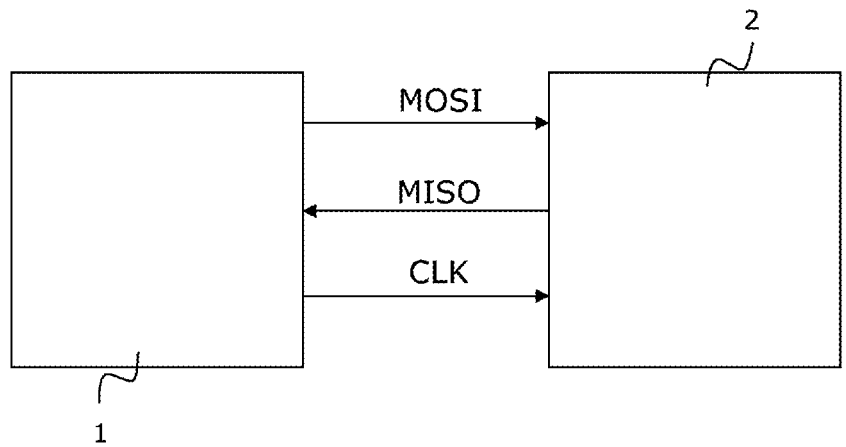

It should be remembered that the existing SPI protocol entails only the synchronous transmission of data at the instigation of a master communication module such as the master computer 1 shown in FIG. 1, which manages the clock signal and selects the slave communication module, in our case the slave computer 2 shown in FIG. 1, with which it wishes to communicate. With each clock tick, the master computer 1 and the slave computer 2 exchange one data bit. It is therefore necessary to provide a cycle of eight clock ticks in order to be able to transmit one byte in both directions. The SPI protocol imposes no other rule.

The present invention entails the improvement of the existing SPI protocol in the form of communication rules which will enable the detection of communication errors.

According to one essential characteristic of the invention, the data are encapsulated in a data field of at least one frame, furthermore including a frame identifier.

Figure 2:
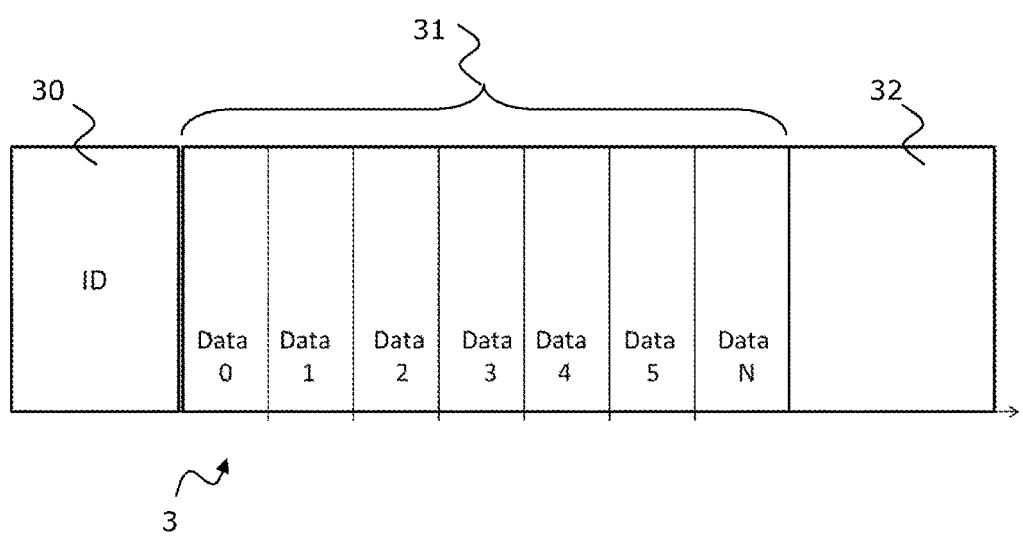

FIG. 2 sets out the preferred structure of a frame 3 used in the context of the invention, with:
    the header field, comprising a frame identifier 30, for example one-byte-coded;
    the data field 31, including one or more bytes.

The frame 3 also preferably comprises a control field 32, for example also one byte in size, to contain binary elements depending on the data included in the data field 31. These control elements may correspond, for example, to a checksum.

According to another important characteristic, a communication between the master module 1 and the slave module 2 consists in at least one simultaneous exchange of two frames according to at least one predetermined sequencing corresponding to a unique pairing of the identifiers of the two simultaneously exchanged frames.

Figures 3, 4:
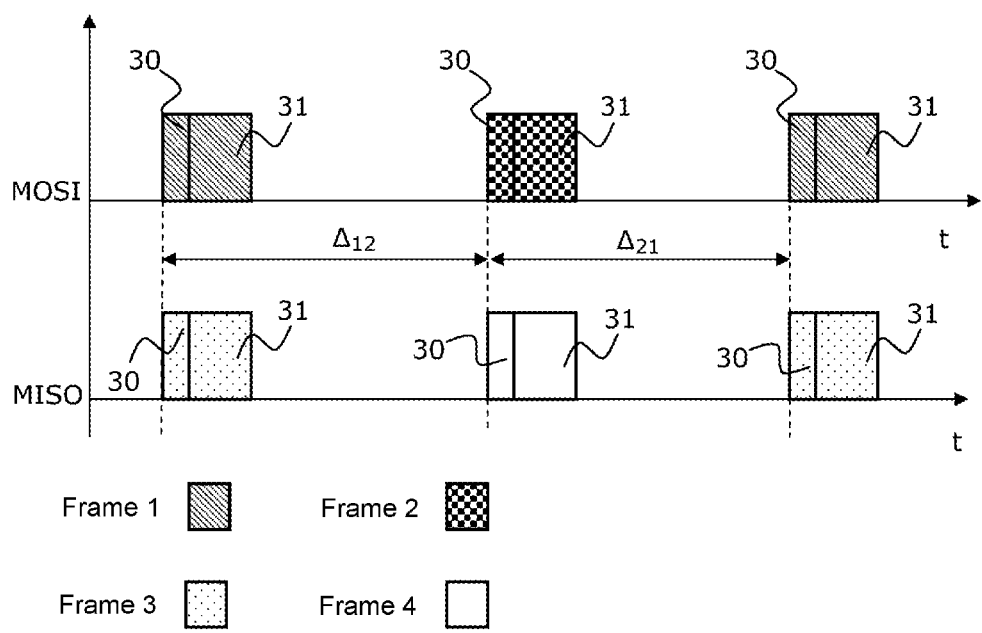
FIG. 4 shows a timing diagram with an example of exchanges of data frames during a communication between the two computers.

By way of a non-limiting example, FIG. 3 shows two possible sequences determining the frames that must be simultaneously exchanged:

A first sequence corresponds to the transmission by the master computer 1 of a frame according to the format shown in FIG. 3 for which the header field 30 contains the identifier 11H. The slave computer 2 must then simultaneously transmit a frame in which the identifier field 30 will contain the identifier 55H.

Similarly, a second sequence corresponds to the transmission by the master computer 1 of a frame according to the format shown in FIG. 3 for which the header field 30 contains the identifier 22H. The slave computer 2 must then simultaneously transmit a frame in which the identifier field 30 will contain the identifier 66H.

"Sequencing" is thus understood to mean the fact of causing each of the computers 1 and 2 to simultaneously transmit a frame, the identifiers of the two simultaneously transmitted frames being paired in a unique manner.

According to the amount of data to be exchanged, the same communication may consist of a single simultaneous exchange of two frames, paired according to any one of the predetermined sequences, or a succession of simultaneous exchanges of two frames, each time paired according to one or the other of the predetermined sequences. By way of example, FIG. 4 shows the case of a communication between a master computer and a slave computer requiring three exchanges, in particular:
    a first exchange during which the master computer transmits a first frame, denoted Frame 1, while the slave computer simultaneously transmits a frame, denoted Frame 3;
    a second exchange during which the master computer transmits a second frame, denoted Frame 2, while the slave computer simultaneously transmits a frame, denoted Frame 4;
    a third and final exchange during which the master computer retransmits Frame 1, and the slave computer simultaneously retransmits Frame 3.

In this example, Frame 1 corresponds, for example, to a frame whose identifier in the corresponding header field is 11H. Given the pairing imposed according to the sequence 1 shown in FIG. 3, Frame 3 must then have the value 55H as an identifier in its own header field 30. Frame 2 for its part corresponds, for example, to a frame whose identifier is 22H. Given the pairing imposed according to the sequence 2 shown in FIG. 3, Frame 4 must then have the value 66H as an identifier. Clearly, the data included in the data fields 31 of the two Frames 1 or the two Frames 3 are generally not identical.

During a communication requiring the transmission of a plurality of successive frames by each of the computers, two frames are transmitted successively by each of these computers according to at least one predetermined inter-frame period. This can be seen, in particular, in the example of FIG. 4 which shows:
    a first time period $\Delta_{12}$ corresponding to the time period elapsing between the start of the transmission by the master module 1 of the first Frame 1 and Frame 2;
    a second time period $\Delta_{21}$, not necessarily identical to the first time period $\Delta_{12}$, this second time period $\Delta_{21}$ corresponding to the time period elapsing between the start of the transmission by the master module 1 of Frame 2 and the second Frame 1.

These time periods are in the region of 10 ms and, as will be explained below, will advantageously prevent a loss of communication or an inconsistency in communication between the master computer 1 and the slave computer 2.

The fact of using at least one determined sequencing for the simultaneous exchange of frames will enable the detection of a communication error between the computers 1 and 2. In fact, each of the computers 1 and 2 is capable of checking the integrity of the transmission by checking that a received frame actually has the expected identifier determined by the sequencing as its identifier.

When a plurality of frames have to be transmitted successively during a communication, each of the modules is furthermore capable of checking the integrity of the communication by calculating the time period separating the reception of two frames and checking that this time period actually corresponds to the expected predefined inter-frame period. In particular, if a frame is received before the inter-frame period, with a margin fixed, for example, at −10%, each module will be able to infer an inconsistency in the communication. If a frame is not received at the end of the inter-frame period, with a margin fixed, for example, at +10%, each module will be able to infer a loss of the communication.

Finally, in the case where the frames further comprise the control field 32, each computer 1 and 2 is furthermore capable of checking the integrity of the received data on the basis of an extraction of the content of the data field 31 and the control field 32.

When a communication error is detected by one of the computers 1 or 2 following the non-adherence to the frame sequencing, the non-adherence to the inter-frame period(s) or, where relevant, a lack of data integrity, this computer will preferably interrupt its own transmission during an interruption time period greater than the inter-frame period. The other computer will thus in turn be quickly informed of the occurrence of an error.

Figure 5A:
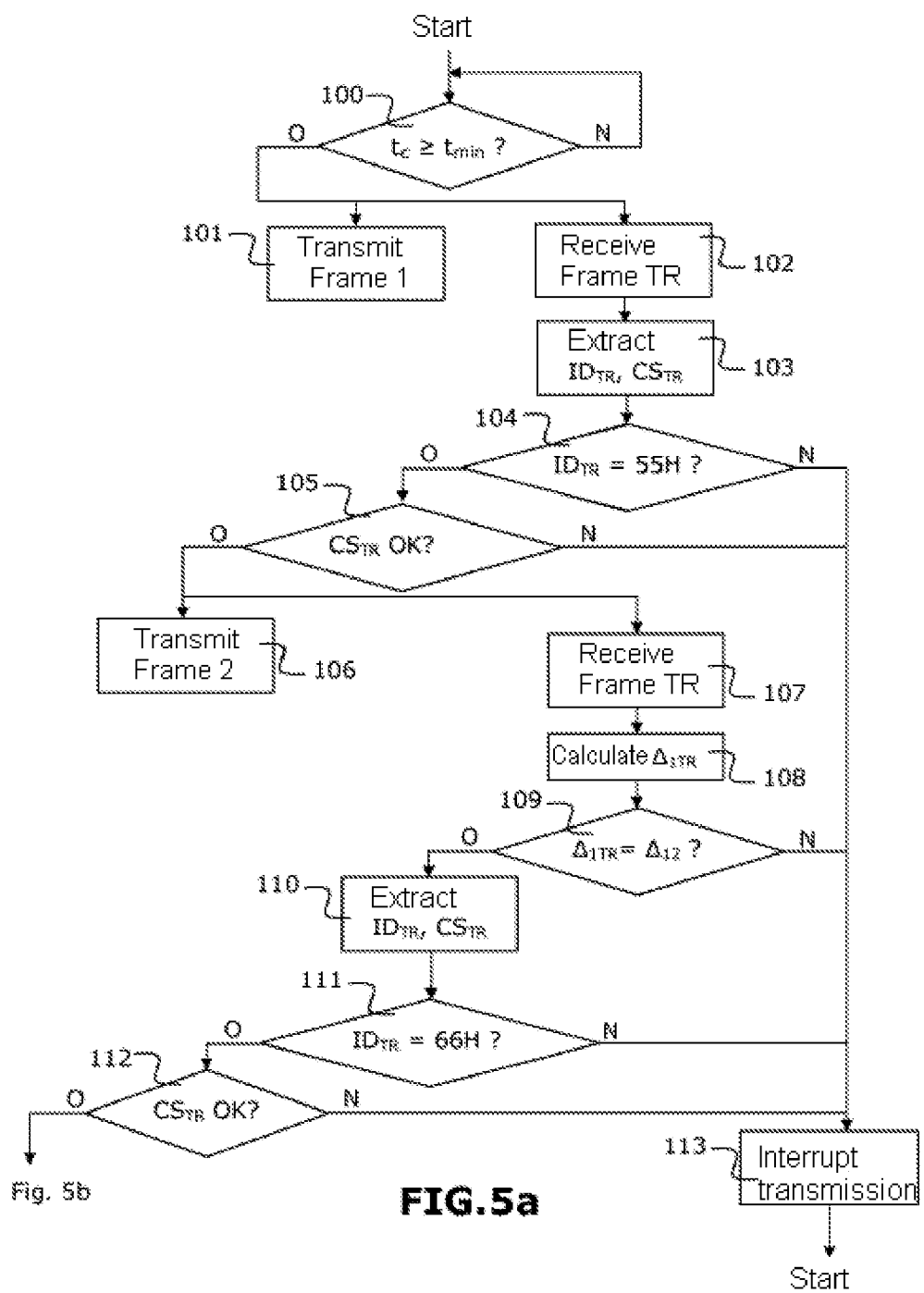
FIGS. 5a and 5b show different steps potentially implemented by the master computer during the communication shown in FIG. 4.
Figure 5B:
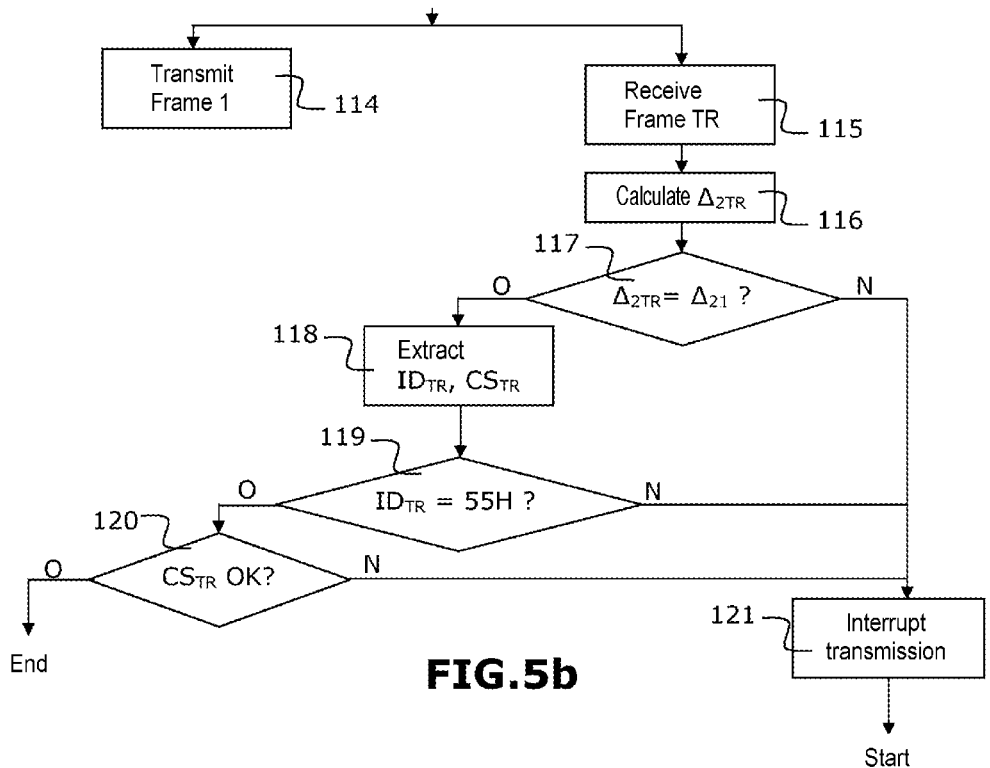
Figure 6A:
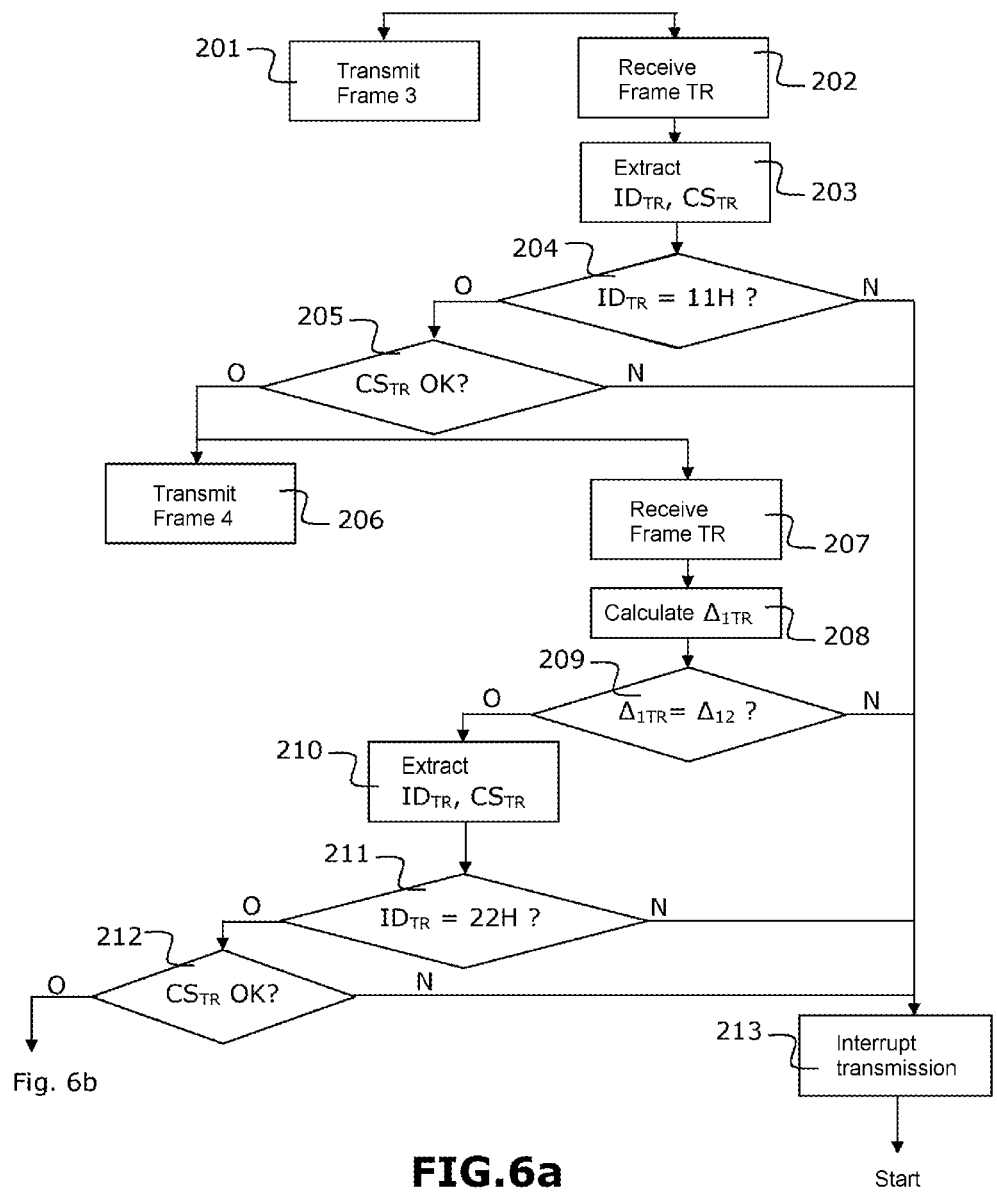
FIGS. 6a and 6b show different steps potentially implemented by the slave computer during the communication shown in FIG. 4.
Figure 6B:
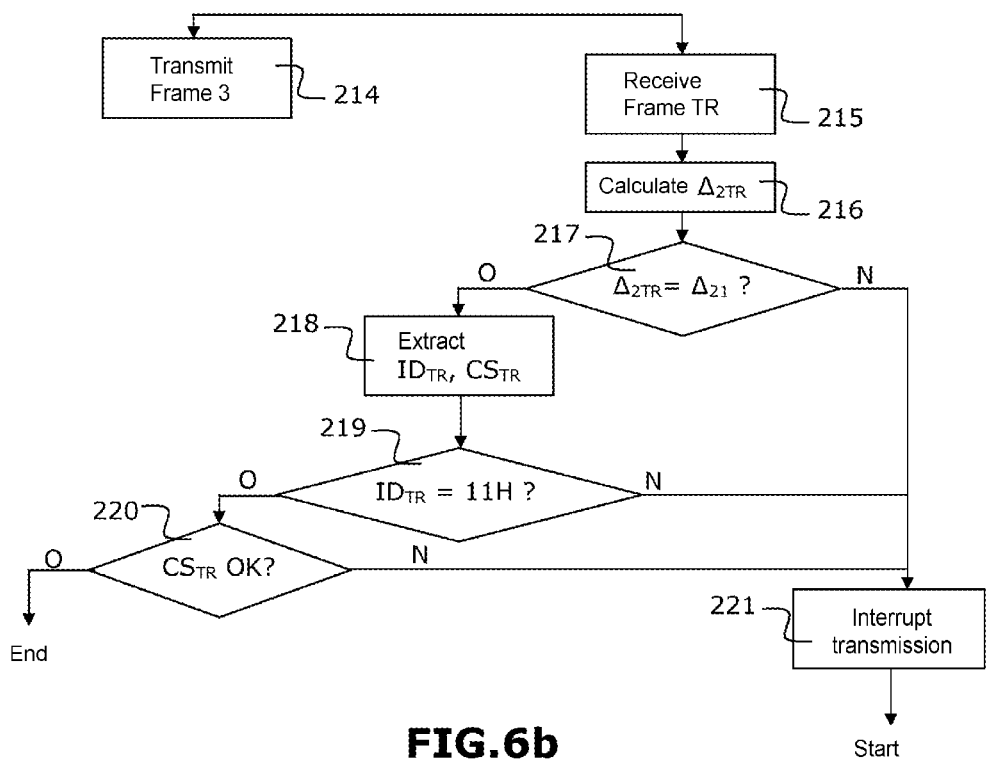

By way of clarification, FIGS. 5a and 5b show all the steps likely to be implemented by the master computer 1, and FIGS. 6a and 6b show all the steps likely to be implemented by the slave computer 2 during the communication according to the sequencing pattern shown by way of example in FIG. 4:

On the part of the master computer 1, it is first of all necessary to initialize the communication in such a way as to start this communication correctly as from the first exchange. To do this, the master computer 1 must preferably ensure that a minimum waiting time period $t_{min}$ has elapsed before the transmission of the first frame. This time period must be greater than the maximum initialization time period of the transmission register of the slave computer in order to guarantee that the latter will be able to transmit Frame 3 simultaneously with the transmission by the master of the first Frame 1. For example, if the maximum initialization time period of the transmission register is in the region of 100 ms, the minimum waiting time period train will be set at around 200 ms. During an initialization step 100, the master communication module 1 compares the current time supplied by its clock with $t_{min}$ in such a way as to initiate the exchange of frames only when the current time exceeds the value of $t_{min}$.

The master computer 1 then transmits the first Frame 1 (step 101) and simultaneously receives (step 102) a frame denoted here TR which corresponds to the first frame transmitted by the slave computer 2.

During a step 103, the master computer 1 extracts from the received frame TR the contents of the different fields, in particular its identifier $ID_{TR}$ and the content $CS_{TR}$ of the control field.

The master computer 1 can then:
on the one hand, check that the received frame TR actually corresponds to the expected Frame 3 on the basis of the identifier $ID_{TR}$ and the sequencing 1, in other words, check in our example that the identifier $ID_{TR}$ is actually equal to 55H (step 104);
on the other hand, check the integrity of the received data on the basis of the content $CS_{TR}$ (step 105).

In FIG. 5a, steps 104 and 105 are successive, but their order could be reversed in an equivalent manner.

If any one of the tests carried out in steps 104 and 105 is negative, the master computer 1 infers therefrom that a communication error has occurred and interrupts any transmission during a time period greater than the inter-frame period $\Delta_{12}$ (step 113), for example in the region of one second.

Conversely, if the two tests carried out in steps 104 and 105 are positive, the master computer 1 then transmits the second frame, here Frame 2 (step 106), and simultaneously receives (step 107) a frame, again denoted here TR, which corresponds to the second frame transmitted by the slave computer 2.

During a step 108, the master computer 1 calculates the time period $\Delta_{IR}$ that has elapsed between the two frame receptions, then checks that this time period actually corresponds to the predefined inter-frame period, in the example the time period $\Delta_{12}$ (step 109).

If necessary, the master computer 1 reiterates the steps of checking the transmission integrity (step 111) and the data integrity (step 112). It should be noted here that step 111 consists in checking that the identifier $ID_{TR}$ of the received frame is actually equal to the expected identifier, in our example the value 66H.

If any one of the tests carried out in steps 109, 111 and 112 is negative, the master computer 1 infers therefrom that a communication error has occurred and interrupts any transmission during a time period greater than the inter-frame period $\Delta_{12}$ (step 113), possibly increased by a 10% safety margin. This has the effect of causing a detection of loss of communication on the part of the slave computer 2.

In the opposite case, as shown in FIG. 5b, a cycle of steps 114 to 120 similar to the preceding cycle of steps 106 to 112 is reiterated, this time with the transmission of the third frame, here again Frame 1, and the simultaneous reception of a frame TR. A slight difference in processing occurs since it is necessary to check in this new cycle:
that the time period $\Delta_{2TR}$ elapsed between the last two received frames, as calculated in step 116 by the master computer 1, actually corresponds to the second predefined inter-frame period, here $\Delta_{21}$ (step 117), and
that the identifier $ID_{TR}$ of the received frame is actually equal to the expected identifier for Frame 3, in our example the value 55H (step 119).

Again, if any one of the tests carried out in steps 117, 119 and 120 is negative, the master computer infers therefrom that a communication error has occurred and interrupts any transmission during a time period greater than the inter-frame period $\Delta_{21}$ (step 121), possibly increased by a 10% safety margin.

FIGS. 6a and 6b show the corresponding processing steps in the slave computer 2, very similar to those already described above.

The first cycle of steps 201 to 205 thus corresponds to the cycle of steps 101 to 105, except that:
the frame transmitted by the slave computer 2 in step 201 is Frame 3;
it must be checked here that the frame TR received by the slave computer in step 202 actually corresponds to the expected frame, in this case Frame 1, with a frame identifier equal to 11H (step 204).

Similarly, the second cycle of steps 206 to 212 corresponds to the cycle of steps 106 to 112, except that:
the frame transmitted by the slave computer 2 in step 203 is Frame 4;
it must be checked here that the frame TR received by the slave computer in step 207 actually corresponds to the expected frame, in this case Frame 2, with a frame identifier equal to 22H (step 211).

Finally, the third cycle of steps 214 to 220 shown in FIG. 6b corresponds to the cycle of steps 114 to 120, except that:
the frame transmitted by the slave computer 2 in step 214 is again Frame 3;
it must be checked here that the frame TR received by the slave computer in step 215 actually corresponds to the expected frame, in this case Frame 1, with a frame identifier equal to 11H (step 219).

If any error is detected at different stages of the communication integrity checking or data integrity checking tests, the slave computer 2 switches to a degraded mode by interrupting any transmission during a time period greater than the inter-frame period (step 213 or 221), possibly increased by a 10% safety margin. This has the effect of causing a detection of loss of communication on the part of the master computer 1.

In order to exit from the degraded mode, the master computer 1 and the slave computer 2 restart the communication initialization sequence, provided that a first exchange has not been performed.

Due to the determined format of the frames, the pairing of the synchronously transmitted frames and, where relevant, the periodicity of the frames, the reliability of the communication is guaranteed, even via an SPI link. It then becomes possible to use an SPI link for automotive applications for which the required functional safety level of the electrical/electronic systems in the motor vehicles would be increased.

The invention claimed is:

1. A method for transmitting synchronous data between a master communication module and a slave communication module via a serial data bus, comprising:
   encapsulating the data to be transmitted by each of the two master and slave communication modules in a data field of at least one frame comprising a frame identifier;
   simultaneously exchanging two frames between the two master and slave communication modules according to at least one predetermined sequencing corresponding to a unique pairing of the identifiers of the two simultaneously exchanged frames;
   checking an integrity of the transmission in each of the two master and slave communication modules on the basis of an extraction of the frame identifier of the two simultaneously exchanged frames according to said at least one predetermined sequencing and by calculating, in each of the two master and slave communication modules, a time period separating two successively received frames and comparing the calculated time period with at least one expected predetermined inter-frame period; and
   interrupting any transmission of frames from one of the two master or slave communication modules during an interruption time period greater than said at least one expected inter-frame period, following any communication error detected during checking of the transmission integrity.

2. The method as claimed in claim 1, wherein each frame further comprises a control field including binary elements dependent on the data to be transmitted, and wherein the method further comprises:
   checking the data integrity in each of the two master and slave communication modules on the basis of an extraction of the content of the data field and the control field of a received frame.

3. The method as claimed in claim 2, wherein the control field includes a checksum.

4. The method as claimed in claim 2, wherein the control field is one-byte-coded.

5. The method as claimed in claim 1, wherein two frames are transmitted successively by each of the two master and slave communication modules, and hearing to at least one predetermined inter-frame period.

6. The method according to claim 1, wherein no exchange of frames is initiated by the master communication module until a predetermined minimum waiting time period has elapsed.

7. The method as claimed in claim 1, wherein the frame identifier is one-byte-coded.

8. A serial data bus for transmitting synchronous data between a master communication module and a slave communication module, comprising:
   a clock (CLK) wire, a Master Input Slave Output (MISO) signal wire, and a Master Output Slave Input (MOSI) signal wire,
   wherein the master communication module transmits to the slave communication module, on the MOSI signal wire, a first frame that encapsulates a first portion of the synchronous data,
   wherein the slave communication module transmits to the master communication module, on the MISO signal wire, a second frame that encapsulates a second portion of the synchronous data,
   wherein the first frame and the second frame each comprises a frame identifier,
   wherein the first frame and the second frame are simultaneously exchanged and checked between the master and slave communication modules according to at least one predetermined sequencing corresponding to a unique pairing of the frame identifiers of the two simultaneously exchanged frames,
   wherein an integrity of the transmission in each of the two master and slave communication modules is checked on the basis of an extraction of the frame identifier of the two simultaneously exchanged frames according to said at least one predetermined sequencing and is calculated, in each of the two master and slave communication modules, a time period separating two successively received frames and comparing the calculated time period with at least one expected predetermined inter-frame period; and
   wherein any transmission of frames from one of the two master or slave communication modules is interrupted during an interruption time period greater than said at least one expected inter-frame period, following any communication error detected during checking of the transmission integrity.

9. A motor vehicle, comprising:
   a master communication module, a slave communication module, and a serial data bus for transmitting synchronous data between the master communication module and the slave communication module,
   wherein the serial data bus comprises a clock (CLK) wire, a Master Input Slave Output (MISO) signal wire, and a Master Output Slave Input (MOSI) signal wire,
   wherein the master communication module transmits to the slave communication module, on the MOSI signal wire, a first frame that encapsulates a first portion of the synchronous data,
   wherein the slave communication module transmits to the master communication module, on the MISO signal wire, a second frame that encapsulates a second portion of the synchronous data,
   wherein the first frame and the second frame each comprise a frame identifier,
   wherein the first frame and the second frame are simultaneously exchanged and checked between the master and slave communication modules according to at least one predetermined sequencing corresponding to a unique pairing of the frame identifiers of the two simultaneously exchanged frames,
   wherein an integrity of the transmission in each of the two master and slave communication modules is checked on the basis of an extraction of the frame identifier of the two simultaneously exchanged frames according to said at least one predetermined sequencing and is calculated, in each of the two master and slave communication modules, a time period separating two successively received frames and comparing the calculated time period with at least one expected predetermined inter-frame period; and
wherein any transmission of frames from one of the two master or slave communication modules is interrupted during an interruption time period greater than said at least one expected inter-frame period, following any communication error detected during checking of the transmission integrity.

\* \* \* \* \*